United States Patent
Chen (10) Patent No.: US 11,940,542 B2
(45) Date of Patent: Mar. 26, 2024

(54) METHOD OF USING MULTIPLE RECEIVED SATELLITE SIGNALS TO COMPENSATE SATELLITE MULTIPATH ESTIMATION ERROR

(71) Applicant: MEDIATEK INC., Hsin-Chu (TW)

(72) Inventor: Kun-Tso Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 217 days.

(21) Appl. No.: 17/670,538

(22) Filed: Feb. 14, 2022

(65) Prior Publication Data

US 2022/0260728 A1 Aug. 18, 2022

Related U.S. Application Data

(60) Provisional application No. 63/150,589, filed on Feb. 18, 2021.

(51) Int. Cl.
*G01S 19/39* (2010.01)
*G01S 19/22* (2010.01)
*G01S 19/32* (2010.01)

(52) U.S. Cl.
CPC .............. *G01S 19/22* (2013.01); *G01S 19/32* (2013.01); *G01S 19/393* (2019.08)

(58) Field of Classification Search
CPC ......... G01S 19/22; G01S 19/32; G01S 19/393
See application file for complete search history.

(56) References Cited

U.S. PATENT DOCUMENTS

| | | | |
|---|---|---|---|
| 2014/0203963 A1 | 7/2014 | Shimada | |
| 2018/0074207 A1* | 3/2018 | Marmet | ................... G01S 19/22 |
| 2020/0132855 A1* | 4/2020 | Lee | .......................... G01S 19/22 |

(Continued)

FOREIGN PATENT DOCUMENTS

| | | |
|---|---|---|
| CN | 101356449 A | 1/2009 |
| CN | 111656223 A | 9/2020 |
| TW | 201007195 A1 | 2/2010 |

(Continued)

OTHER PUBLICATIONS

P.V. Hung et al., A Novel Multipath Mitigation Technique for GNSS Software Receiver, The 2012 International Conference on Advanced Technologies for Communications (ATC 2012), p. 37-40 (Year: 2012).*

*Primary Examiner* — Bernarr E Gregory
*Assistant Examiner* — Fred H Mull
(74) *Attorney, Agent, or Firm* — Winston Hsu

(57) ABSTRACT

The present invention provides a receiver including an RF circuit, a correlator and a signal delay estimator. The RF circuit is configured to receive a first satellite signal and a second satellite signal to generate a first base-band signal and a second base-band signal, respectively. The correlator is configured to use a first local signal to integrate with the first base-band signal to generate a first correlation result, and to use a second local signal to integrate with the second base-band signal to generate a second correlation result. The signal delay estimator is coupled to the correlator, and is configured to use the second correlation result to compensate the first correlation result to generate a compensated first correlation result, and determine a signal delay of the first satellite signal according to the compensated first correlation result.

26 Claims, 5 Drawing Sheets

(56) References Cited

U.S. PATENT DOCUMENTS

2021/0132236 A1\* 5/2021 Cookman ............... G01S 19/22
2022/0137234 A1\* 5/2022 Syrjärinne .............. G01S 19/22
                                                     342/357.61

FOREIGN PATENT DOCUMENTS

TW            I439718        6/2014
TW         201905494 A       2/2019
WO     WO-2010098465 A1 \*   9/2010   ............. G01S 19/22

\* cited by examiner

METHOD OF USING MULTIPLE RECEIVED SATELLITE SIGNALS TO COMPENSATE SATELLITE MULTIPATH ESTIMATION ERROR

CROSS REFERENCE TO RELATED APPLICATIONS

This application claims the priority of U.S. Provisional Application No. 63/150,589 (filed on 2021 Feb. 18), which is included herein by reference in its entirety.

BACKGROUND

A satellite-based positioning receiver needs to measure a distance between the receiver and the satellite by estimating and tracking time of arrival (ToA) of a direct path (i.e., line-of-sight, LoS) from the satellite to the receiver. In the conventional art, the receiver uses correlators to output an auto-correlation function (ACF) of a satellite signal to estimate a delay between the local replica signal and the received signal corresponding to the direct path. However, if multi-path signals (i.e., a direct path signal and reflected path signals) are received, the ACF will be distorted, causing estimation error of the ToA of the direct path. This estimation error will induce error in the calculation of the user position.

SUMMARY

It is therefore an objective of the present invention, which can calibrate the ACF distortion of the received satellite signal by using another received satellite signal, to eliminate the estimation error of the ToA of the direct path, to solve the above-mentioned problems.

According to one embodiment of the present invention, a receiver comprising an RF circuit, a correlator and a signal delay estimator is disclosed. The RF circuit is configured to receive a first satellite signal and a second satellite signal to generate a first base-band signal and a second base-band signal, respectively. The correlator is configured to use a first local signal to integrate with the first base-band signal to generate a first correlation result, and to use a second local signal to integrate with the second base-band signal to generate a second correlation result. The signal delay estimator is coupled to the correlator, and is configured to use the second correlation result to compensate the first correlation result to generate a compensated first correlation result, and determine a signal delay of the first satellite signal according to the compensated first correlation result.

According to another embodiment of the present invention, a signal processing method comprises the steps of: receiving a first satellite signal and a second satellite signal to generate a first base-band signal and a second base-band signal, respectively; using a first local signal to integrate with the first base-band signal to generate a first correlation result; using a second local signal to integrate with the second base-band signal to generate a second correlation result; and using the second correlation result to compensate the first correlation result to generate a compensated first correlation result, and determine a signal delay of the first satellite signal according to the compensated first correlation result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

The present invention uses a first satellite signal to compensate a second satellite signal to lower the estimation error of a time of arrival (ToA), wherein the each of the first satellite signal and the second satellite signal is a composite satellite signal formed by a direct path signal and one or more reflected path signal. In this embodiment of the present invention, the direct path signal generally refers to the one with the shortest signal delay among the satellite signals received by the receiver.

Figure 1:
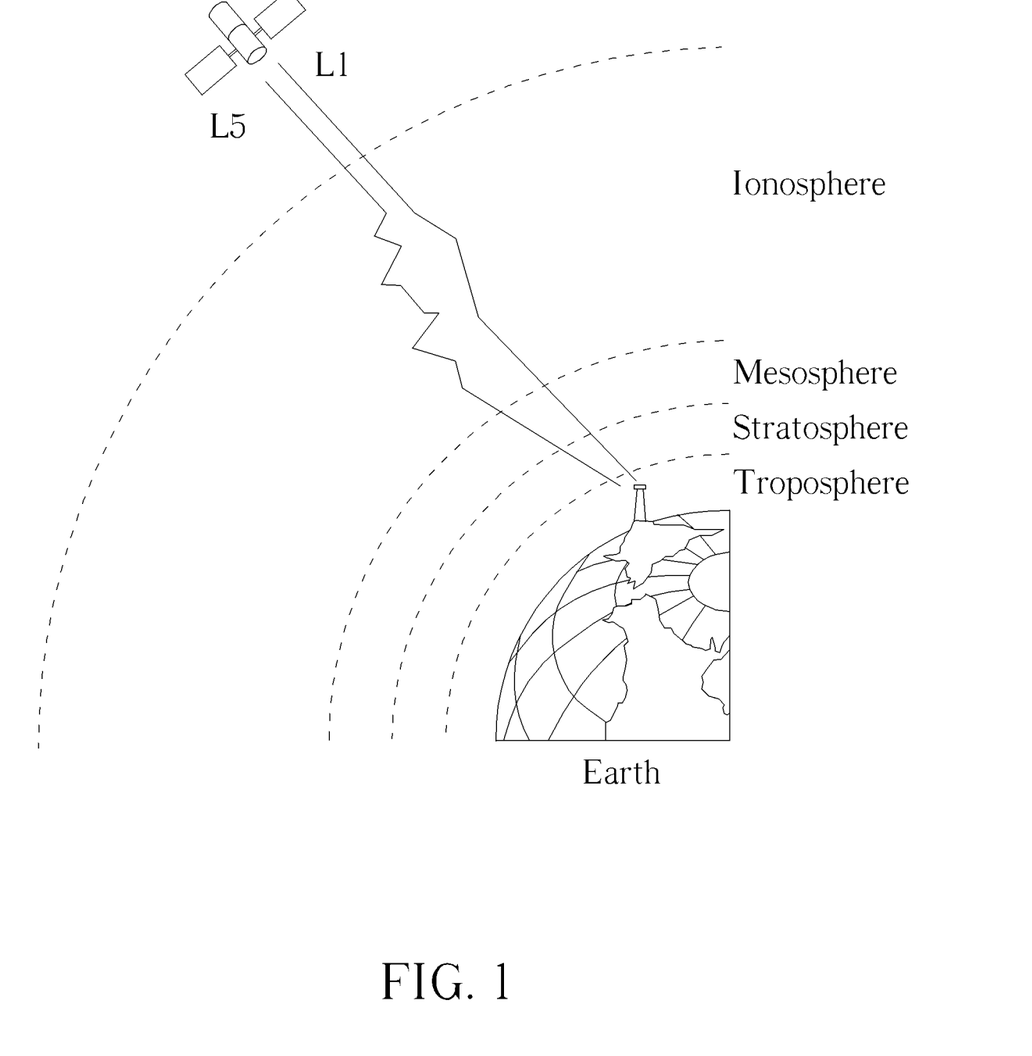
FIG. 1 is a diagram illustrating a satellite system transmitting multiple signals.

FIG. 1 is a diagram illustrating a satellite system transmitting multiple signals. The satellite system includes Global Navigation Satellite System (GNSS) such as GPS, Galileo, GLONASS, BeiDou, NavIC (Indian Regional Navigation Satellite System), QZSS (Quasi-Zenith Satellite System) and SBAS (Satellite-Based Augmentation System). A satellite in these systems transmits multiple signals in different RF frequency and modulation formats at the same time. As shown in FIG. 1, one satellite transmits different satellite signals such as L1 signal and L5 signal of a global positioning system (GPS), wherein a pseudorandom noise number (PRN) code chip rate of the L5 signal is ten times faster than that of the L1 signal, and the timing of the L1 signal and the L5 signal are synchronized.

Figure 2:
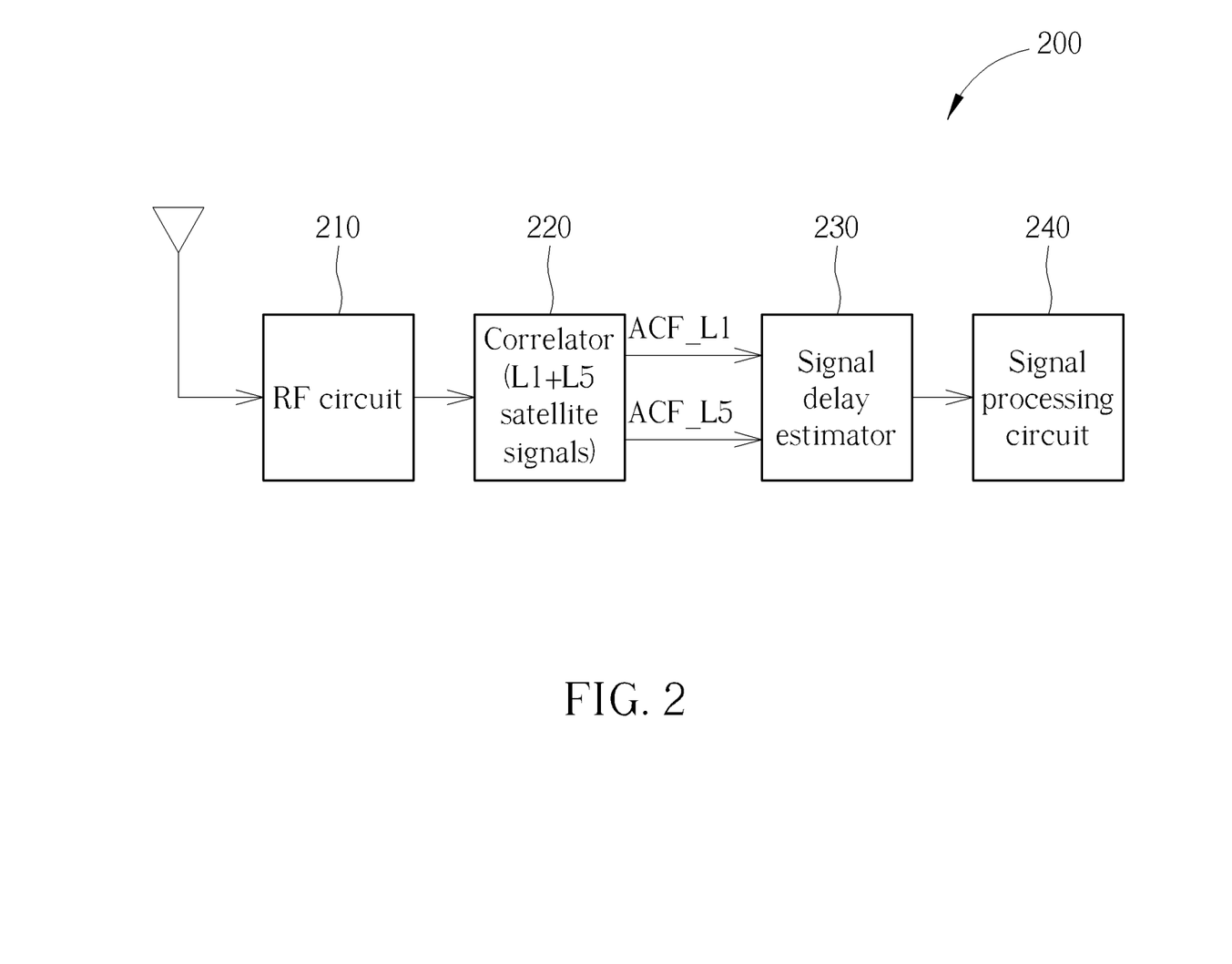
FIG. 2 is a diagram illustrating a receiver according to one embodiment of the present invention.

FIG. 2 is a diagram illustrating a receiver 200 according to one embodiment of the present invention. As shown in FIG. 2, the receiver 200 comprises a radio-frequency (RF) circuit 210, a correlator 220, a signal delay estimator 230 and a signal processing circuit 240. In this embodiment, the receiver 200 is positioned in an electronic device such as a cell phone, a table or a watch, and the receiver 200 is configured to receive the L1 signal (LICA signal for example) and the L5 signal to determine a position of the electronic device. The received satellite signals can include signals from the same satellite, other satellites in the satellite system, or other satellites in the other satellite system. For example, a GPS satellite can transmit L1CA, L1C (including data and pilot component signal), L2C (including CL and CM component signal), and L5 (including I5 and Q5 component signal). A Galileo satellite can transmit E1 (including E1B and E1C component signal), E5a (including data and pilot component signal) and E5b (including data and pilot component signal) and E6 signals. Multiple signals are transmitted in the same satellites too in the other satellite systems such as BeiDou, GLONASS, NavIC and SBAS. In the receiver 200, we show how to use a second signal from the same satellite to compensate the multipath error of a first signal in the same satellite. The same approach can be applied to receive more than one signal and compensate the multipath error of a first signal. The correlator 220, the signal delay estimator 230 and the signal processing circuit 240 can be implemented in hardware circuits or software programs.

In the operation of the receiver 200, the RF circuit 210 receives satellite signals, and converts the satellite signals to base-band signals, wherein the satellite signals comprise the L1 signal and the L5 signal, and the base-band signals comprise L1 base-band signal and L5 base-band signal. The correlator 220 generates a local signal replica based on format of the satellite signal, and performs a correlation operation with the received baseband signal with the local signal replica to generate a correlation value. In addition, the correlator 220 may comprise (but not necessary) a first correlator and a second correlator, wherein the first correlator is configured to perform a correlation operation based on a first local signal replica and the first baseband signal to generate a first correlation result such as the autocorrelation function ACF_L1 for the L1 signal, and the second correlator is configured to perform a correlation operation based on a second local signal replica and the second baseband signal to generate a second correlation result such as the autocorrelation function ACF_L5 for the L5 signal. Specifically, the first correlator may use a local L1 signal to integrate with the received L1 base-band signal to generate ACF_L1, wherein the first correlator may have the following operations: Doppler inter-frequency removal, satellite PRN code wipe off, inner product between the L1 base-band signal and the local L1 signal and the signal integration. Similarly, the second correlator may use a local L5 signal to integrate with the received L5 base-band signal to generate ACF_L5, wherein the second correlator may have the following operations: Doppler inter-frequency removal, satellite PRN code wipe off, inner product between the L5 base-band signal and the local L5 signal and the signal integration. Because the detailed operations of the correlator are known by a person skilled in the art, further descriptions are omitted here. The main feature of the present invention is to use the correlation result of the L5 signal to compensate the correlation result of the L1 signal to obtain an accurate delay corresponding to the direct path of the L1 signal, to reduce the interference of the reflection path of the L1 signal.

Figure 3:
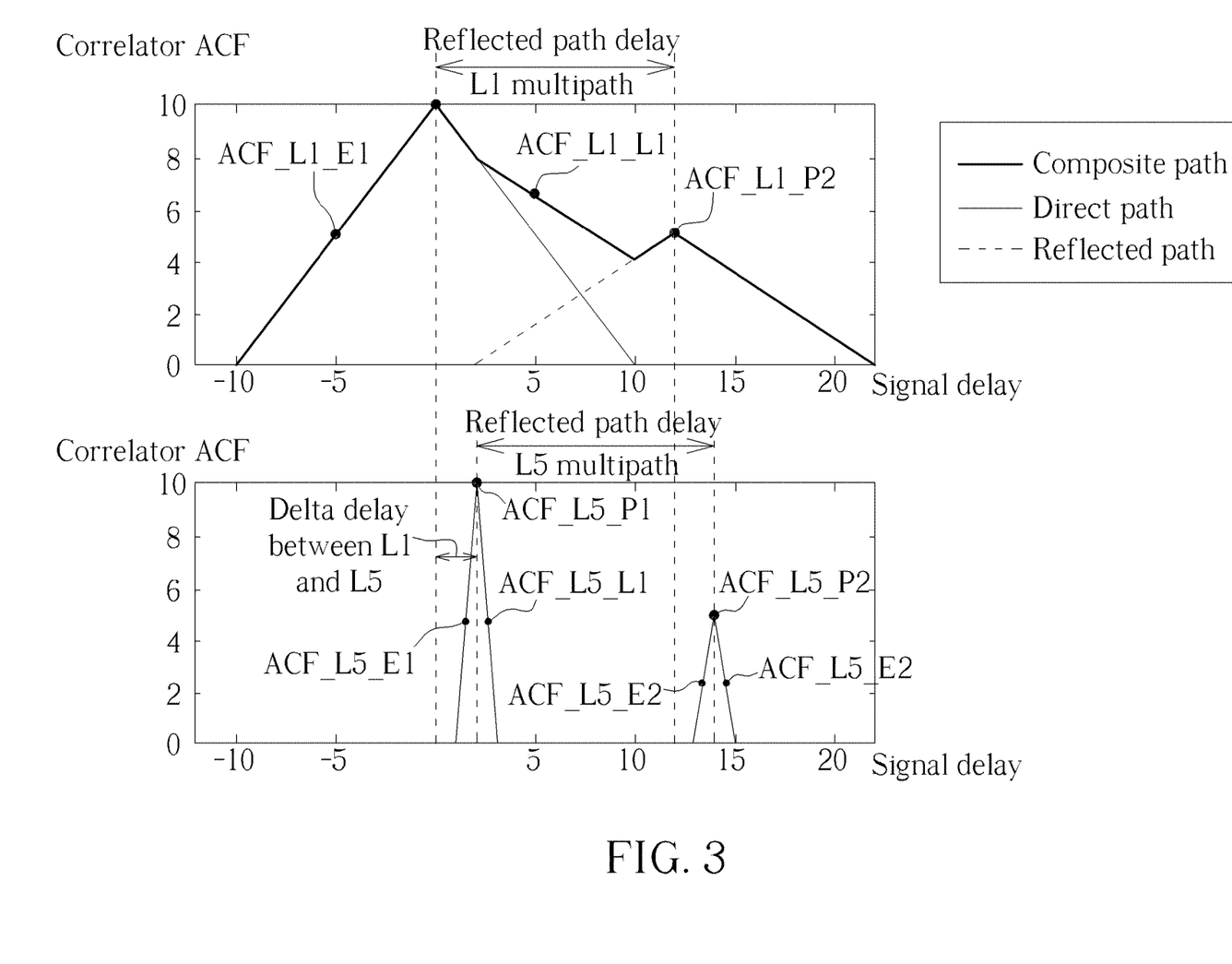
FIG. 3 is a diagram illustrating the ACF_L1 and the ACF_L5 according to one embodiment of the present invention.

Refer to FIG. 3, which is a diagram illustrating the ACF_L1 and the ACF_L5 according to one embodiment of the present invention. As shown in FIG. 3, assuming that the ACF_L1 corresponding to a composite path comprises a direct path and a multipath path (for example, reflected path), the first correlator performs a correlation operation on the received L1 signal to generate the correlation result named as ACF_L1_Composite (T), where T is the time delay between the received signal and the local L1 signal. If only the direct path signal is received, the correlation result calculated by the first correlator can be expressed as ACF_L1_Direct (T); and if only the reflected path signal is received, the correlation result calculated by the first correlator can be expressed as ACF_L1_Reflect (T). ACF_L1_Composite (T) is equivalent to a combination of ACF_L1_Direct (T) and ACF_L1_Reflect (T). Similarly, the second correlator performs a correlation operation on the received L5 signal to generate the correlation result named as ACF_L5_Composite (T), where T is the time delay between the received signal and the local L5 signal. If only the direct path signal is received, the correlation result calculated by the second correlator can be expressed as ACF_L5_Direct (T); and if only the reflected path signal is received, the correlation result calculated by the second correlator can be expressed as ACF_L5_Reflect (T). ACF_L5_Composite (T) is equivalent to a combination of ACF_L5_Direct (T) and ACF_L5_Reflect (T).

In the upper half part of FIG. 3, the left triangle is the ACF corresponding to the direct path (i.e., ACF_L1_Direct (T)), the right triangle with the dotted line is the ACF corresponding to the reflected path (i.e., ACF_L1_Reflect (T)), wherein a width of a base of each triangle is determined based on the PRN code chip rate. The position of the right triangle depends on the delay of the reflected path. Note that the ACF is a triangle in the demonstrated embodiment here, but the ACF of a satellite signal is not limited to a triangle. For example, the ACF of GPS L1C signal is three triangle because the BOC (binary offset carrier) modulation in L1C signal.

In this embodiment, because the L1 signal has a lower PRN code chip rate, the ACF corresponding to the direct path and the ACF corresponding to the reflected path are overlapped, causing a shape of the ACF_L1 corresponding to the composite path is not symmetrical. In other words, when the reflected path signal delay is small, ACF_L1_Direct(T) and ACF_L1_Reflect(T) partially overlap, and the correlation result value of the L1 signal calculated by the correlator is no longer ACF_L1_Direct(T), but additionally includes the contribution of ACF_L1_Reflect (T).

In addition, the ACF_L5 comprises a direct path and a reflected path, the left triangle is the ACF corresponding to the direct path, the right triangle is the ACF corresponding to the reflected path. In this embodiment, because the L5 signal has higher PRN code chip rate, a width of a base of each triangle of the ACF will be smaller, and the ACF corresponding to the direct path and the ACF corresponding to the reflected path are not overlapped (i.e., the ACF of the L5 signal is narrower than the ACF of the L1 signal).

In one embodiment, because reflected path delay of the ACF_L1 is the same as the reflected path delay of the ACF_L5, the signal delay estimator 230 can calculate a time difference between the peak (prompt code correlation ACF_L5_P1) corresponding to the direct path and the peak (prompt code correlation ACF_L5 P2) corresponding to the reflected path to obtain the reflected path delay of the ACF_L5, and the signal delay estimator 230 further uses a delta delay between the L5 signal and the L1 signal to estimate the peak position of the ACF corresponding to the reflected path, for estimating the ACF corresponding to the reflected path of the L1 signal, wherein the delta delay between the L5 signal and the L1 signal can be estimated by using a known ionospheric model. For further refining the estimation, the signal delay estimator 230 can subtract the estimated the ACF corresponding to the reflected path of the L1 signal from the ACF_L1 to obtain the compensated ACF, wherein the compensated ACF is similar to the ACF corresponding to the direct path of the L1 signal. Specifically, assuming that the peaks of ACF_L1_Direct(T), ACF_L1_Reflect(T), ACF_L5_Direct(T) and ACF_L5_Reflect(T) correspond to $T_{L1,DP}$, $T_{L1,RP}$, $T_{L5,DP}$ and $T_{L5,RP}$, because the ACF_L1_Reflect (T) and ACF_L5_Reflect (T) have the similar delay time, the signal delay estimator 230 can calculate a time difference between $T_{L5,DP}$ and $T_{L5,RP}$, wherein the time difference between $T_{L5,DP}$ and $T_{L5,RP}$ can be served as a time difference between $T_{L1,DP}$ and $T_{L1,RP}$, and the signal delay estimator 230 can use this time difference to know the relationship between ACF_L1_Direct(T) and ACF_L1_Reflect(T), in order to remove ACF_L1_Reflect(T) from ACF_L1_Composite (T) to obtain ACF_L1_Direct(T).

In another embodiment, the correlator 220 provides an early code correlation value (hereinafter using ACF_L1_E1 to describe) and a late code correlation value (hereinafter, ACF_L1_L1) to the signal delay estimator 230, wherein the early code correlation value ACF_L1_E1 is correlated with a local signal whose timing is earlier than a prompt local signal by 0.5 PRN code chip (hereinafter, ACF_L1_P1 is used to describe prompt code correlation value), and the late code correlation value ACF_L1_L1 is correlated with a local signal whose timing is later than the prompt local signal by 0.5 PRN code chip. As shown in FIG. 3, because the ACF_L1 (i.e., ACF_L1_Composite(T)) is distorted, the late code correlation value ACF_L1_L1 is incorrect. Therefore, the signal delay estimator 230 can subtract the estimated ACF corresponding to the reflected path of the L1 signal from the ACF_L1 to obtain the compensated ACF to obtain a new early code correlation value and/or a new late code correlation value, for determining signal arrival time of the direct path. For example, in FIG. 4, the original late code correlation value ACF_L1_L1 is adjusted to be the new late code correlation value ACF_L1_L1', for the signal delay estimator 230 to calculate the path delay of the L1 signal.

It is noted that each of the prompt, early and the late code correlation value is generated by performing a correlation between the satellite signal and different local replica. In one embodiment, m ACF_L1 correlation values and n ACF_L5 correlation values, wherein m and n are integers equal to or greater than one. For example, if m is equal to two while n is equal to one, it means that the signal delay estimator 230 uses one ACF_L5 correlation value to compensate two ACF_L1 correlation values according to the characteristics of the ACF_L1 and the ACF_L5 and a time difference between the ACF_L1 and the ACF_L5 correlation values.

Figure 4:
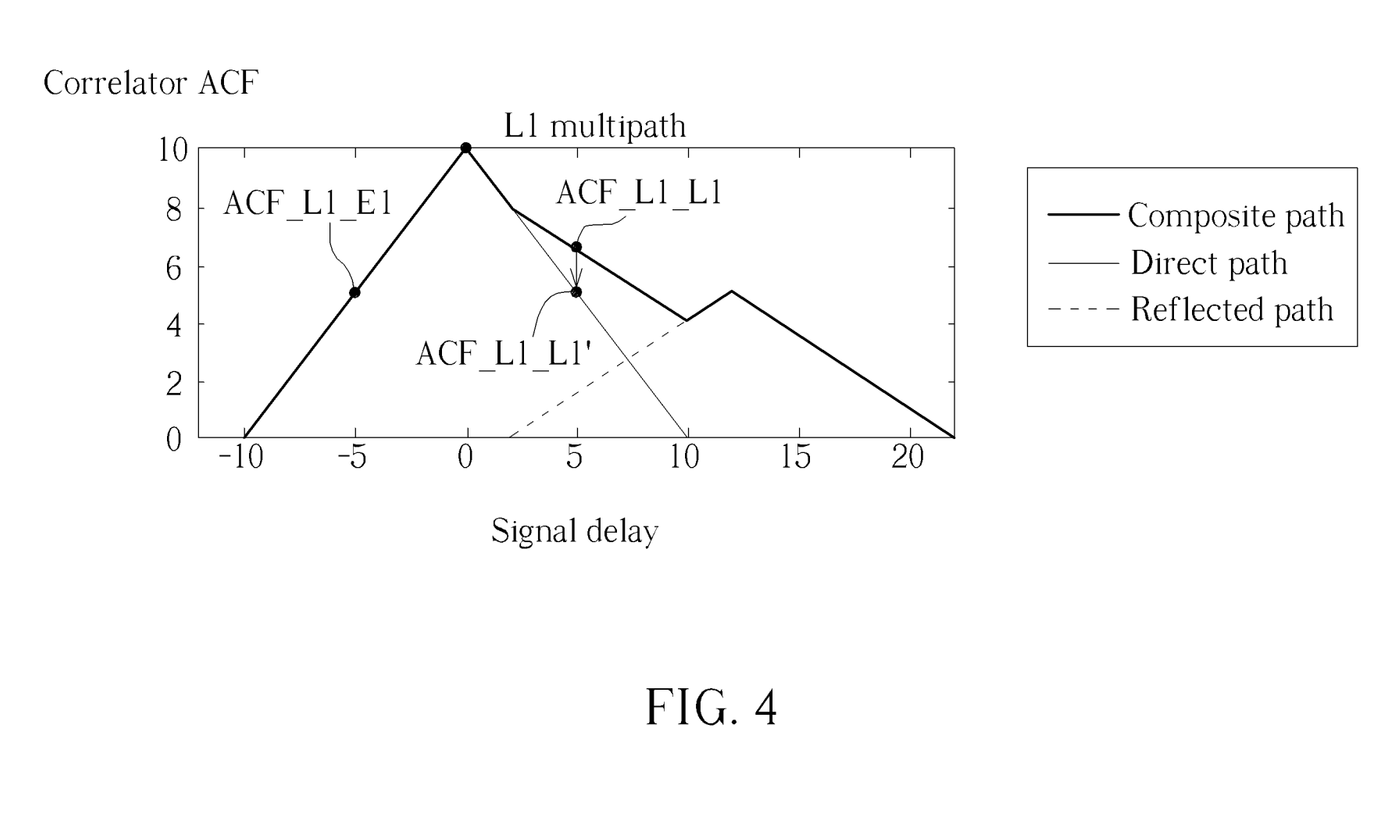
FIG. 4 is a diagram of compensating the ACF_L1 according to one embodiment of the present invention.
Figure 5:
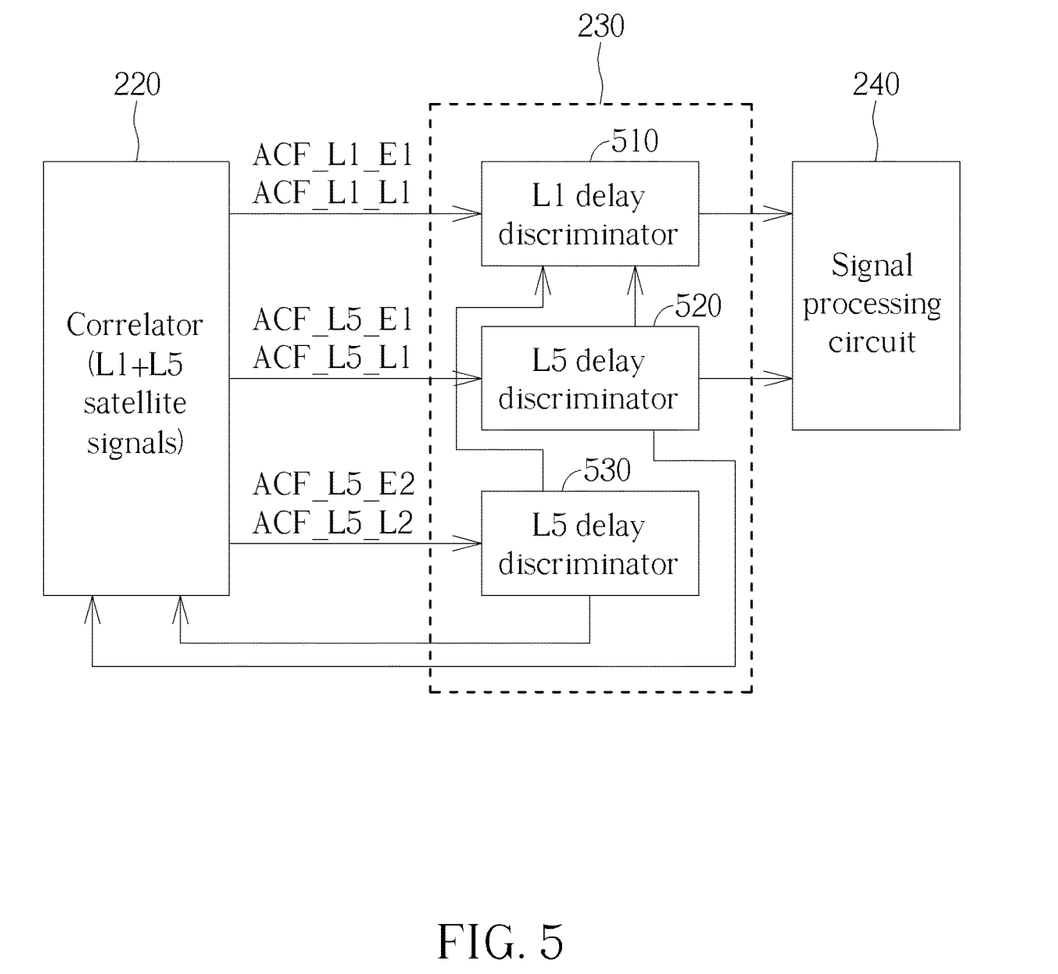
FIG. 5 is a diagram illustrating a signal delay estimator according to one embodiment of the present invention.

FIG. 5 is a diagram illustrating a signal delay estimator 230 according to one embodiment of the present invention. As shown in FIG. 5, the signal delay estimator 230 comprises a L1 delay discriminator 510 and two L5 delay discriminators 520 and 530. In this embodiment, the correlator 220 provides the early code correlation value ACF_L1_E1 and the late code correlation value ACF_L1_L1 of the direct path of the L1 signal to the L1 delay discriminator 510, and the correlator 220 further provides the early code correlation value ACF_L5_E1 and the late code correlation value ACF_L5_L1 of the direct path of the L5 signal to the L5 delay discriminator 520, and provides the early code ACF_L5_E2 correlation value and the late code correlation value ACF_L5_L2 of the reflected path of the L5 signal to the L5 delay discriminator 530. Then, the L1 delay discriminator 510 uses ACF_L1_E1 and ACF_L1_L1 to calculate the signal delay of the direct path of the L1 signal, the L5 delay discriminator 520 uses ACF_L5_E1 and ACF_L5_L1 to estimate the signal delay of the direct path of the L5 signal, and the L5 delay discriminator 520 uses ACF_L5_E2 and ACF_L5_L2 to estimate the signal delay of the reflected path of the L5 signal. After the signal delay of the direct path of the L1 signal, the signal delay of the direct path of the L5 signal and the signal delay of the reflected path of the L5 signal are determined, the L1 delay discriminator 510 can predict the signal delay of reflected path of the L1 signal by using the following equation:

$$L1\_R\_delay = L1\_D\_delay + (L5\_R\_delay - L5\_D\_delay); \quad (1)$$

where "L1_R_delay" is the signal delay of the reflected path of the L1 signal, "L1_D_delay" is the signal delay of the direct path of the L1 signal, "L5_R_delay" is the signal delay of the reflected path of the L5 signal, and "L1_D_delay" is the signal delay of the direct path of the L5 signal. Furthermore, the L1 delay discriminator 510 can predict the magnitude of reflected path of the L1 signal by using the following equation:

$$L1\_R\_M = L1\_D\_M * (L5\_R\_M/L5\_D\_M); \quad (2)$$

wherein "L1_R_M" is the magnitude of the reflected path of the L1 signal, "L1_D_M" is the magnitude of the direct path of the L1 signal, "L5_R_M" is the magnitude of the reflected path of the L5 signal, and "L5_D_M" is the magnitude of the direct path of the L5 signal. Then, after the signal delay of reflected path of the L1 signal and the magnitude of reflected path of the L1 signal are estimated, and the shape of the ACF of the reflected path of the L1 signal is known, the L1 delay discriminator 510 can subtract the estimated the ACF corresponding to the reflected path of the L1 signal from the ACF_L1 to obtain the compensated ACF to obtain a new code and/or a new late code, for determining the peak (the prompt code ACF_L1_P1) of the direct path. For example, in FIG. 4, the original correlation value ACF_L1_L1 is adjusted to be the new value ACF_L1_L1', for the signal delay estimator 230 to calculate the new signal delay of the L1 signal.

In light of above, by using the information of the L5 signal, the ACF_L1 can be appropriate compensated to remove the ACF corresponding to the reflected path of the L1 signal, so that the signal delay of the L1 signal can be determined more accurately, for the signal processing circuit 240 to determine the ToA and the position of the electronic device.

It is noted that the GPS system mentioned above is an example, without a limitation of the present invention. In other embodiments, the receiver 200 may support Galileo satellite navigation system, and the receiver 200 can use the E5a/E5b signal to estimate the reflected path of the E1 signal to compensate the ACF corresponding to the E1 signal; or the receiver 200 may support BeiDou satellite navigation system, and the receiver 200 can use the B2a/B2b signal to estimate the reflected path of the BlI/B1C signal to compensate the ACF corresponding to the BlI/B1C signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver, comprising:
   an radio-frequency (RF) circuit, configured to receive a first satellite signal and a second satellite signal to generate a first base-band signal and a second base-band signal, respectively,
   a correlator, configured to use a first local signal to integrate with the first base-band signal to generate a first correlation result, and to use a second local signal to integrate with the second base-band signal to generate a second correlation result;
   a signal delay estimator, coupled to the correlator, configured to use the second correlation result to compensate the first correlation result to generate a compensated first correlation result, and determine a signal delay of the first satellite signal according to the compensated first correlation result.

2. The receiver of claim 1, wherein an Auto-Correlation-Function (ACF) of the first satellite signal is different from the ACF of the second satellite signal.

3. The receiver of claim 2, wherein the ACF of the first satellite signal is wider than the ACF of the second satellite signal.

4. The receiver of claim 2, wherein the first satellite signal and the second satellite signal are from a same satellite of a satellite system, and the satellite system comprises one of a Global Positioning System (GPS), a Quasi Zenith Satellite System (QZSS), a Galileo satellite navigation system, a BeiDou satellite navigation system, a GLONASS system, an Indian Regional Navigation Satellite System (NavIC) and a Satellite-Based Augmentation System (SBAS).

5. The receiver of claim 2, wherein the first correlation result is a composite ACF comprising a first ACF corresponding to a direct path of the first satellite signal and a second ACF corresponding to a reflected path of the first satellite signal, and the second correlation result comprises a third ACF corresponding to a direct path of the second satellite signal and a fourth ACF corresponding to a reflected path of the second satellite signal; and the signal delay estimator predicts the second ACF according to the fourth ACF, and uses the predicted second ACF to compensate the composite ACF to obtain the compensated first correlation result.

6. The receiver of claim 2, wherein the first correlation result comprises m sample points of the ACF corresponding to the first satellite signal, and the second correlation result comprises n sample points of the ACF corresponding to the second satellite signal, and the signal delay estimator uses the relationship among the ACF of the first satellite signal, the ACF of the second satellite signal, the m sample points of the ACF of the first satellite and then sample points of the ACF of the second satellite signal, to compensate values of the m sample points of the first satellite signal.

7. The receiver of claim 6, wherein m is equal to two, and n is equal to one.

8. The receiver of claim 6, where the first correlation result comprises two sample points of the ACF of the first satellite signal corresponding to early and late local signal replica of the first satellite signal, which are used to track the direct path of the first satellite signal.

9. The receiver of claim 6, where the first correlation result comprises one sample point of ACF of the first satellite signal corresponding to prompt local signal replica of the first satellite signal, which is used to track and/or decode the direct path of the first satellite signal.

10. The receiver of claim 6, where the second correlation result comprises one sample point of the ACF of the second satellite signal, which is used to search possible reflected path of the second satellite signal.

11. The receiver of claim 6, where the first correlation result comprises one sample point of the ACF of the first satellite signal corresponding to prompt local signal replica of the first satellite signal, and the second correlation result comprises two sample points of the second satellite ACF corresponding to the prompt local signal replica of the direct and reflected path respectively.

12. The receiver of claim 2, wherein the first correlation result is a composite ACF comprising an early code and a late code correlation of a first ACF corresponding to a direct path of the first satellite signal and a second ACF corresponding to a reflected path of the first satellite signal, and the second correlation result comprises an early code and a late code correlation of a third ACF corresponding to a direct path of the second satellite signal, and an early code and a late code of a fourth ACF corresponding to a reflected path of the second satellite signal; and the signal delay estimator predicts the second ACF according to the early code and the late code of the third ACF and the early code and the late code of the fourth ACF, and uses the predicted second ACF to compensate the composite ACF to obtain the compensated first correlation result.

13. The receiver of claim 12, wherein the signal delay estimator uses the predicted second ACF to compensate at least one of the early code and the late code of a first ACF to obtain the compensated first correlation result.

14. A signal processing method, comprising:
   receiving a first satellite signal and a second satellite signal to generate a first base-band signal and a second base-band signal, respectively;
   using a first local signal to integrate with the first base-band signal to generate a first correlation result;
   using a second local signal to integrate with the second base-band signal to generate a second correlation result; and
   using the second correlation result to compensate the first correlation result to generate a compensated first correlation result, and determining a signal delay of the first satellite signal according to the compensated first correlation result.

15. The signal processing method of claim 14, wherein an Auto-Correlation-Function (ACF) of the first satellite signal is different from the ACF of the second satellite signal.

16. The signal processing method of claim 15, wherein the ACF of the first satellite signal is wider than the ACF of the second satellite signal.

17. The signal processing method of claim 15, wherein the first satellite signal and the second satellite signal are from a same satellite of a satellite system, and the satellite system comprises one of a Global Positioning System (GPS), a Quasi Zenith Satellite System (QZSS), a Galileo satellite navigation system, a BeiDou satellite navigation system, a GLONASS system, an Indian Regional Navigation Satellite System (NavIC) and a Satellite-Based Augmentation System (SBAS).

18. The signal processing method of claim 15, wherein the first correlation result is a composite ACF comprising a first ACF corresponding to a direct path of the first satellite signal and a second ACF corresponding to a reflected path of the first satellite signal, and the second correlation result comprises a third ACF corresponding to a direct path of the second satellite signal and a fourth ACF corresponding to a reflected path of the second satellite signal; and the step of using the second correlation result to compensate the first correlation result to generate the compensated first correlation result comprises: predicting the second ACF according to the fourth ACF, and using the predicted second ACF to compensate the composite ACF to obtain the compensated first correlation result.

19. The signal processing method of claim 15, wherein the first correlation result comprises m sample points of the ACF corresponding to the first satellite signal, and the second correlation result comprises n sample points of the ACF corresponding to the second satellite signal, and the signal processing method further comprises:
using the relationship among the ACF of the first satellite signal, the ACF of the second satellite signal, the m sample points of the ACF of the first satellite and the n sample points of the ACF of the second satellite signal, to compensate values of the m sample points of the first satellite signal.

20. The signal processing method of claim 19, wherein m is equal to two, and n is equal to one.

21. The signal processing method of claim 19, where the first correlation result comprises two sample points of the ACF of the first satellite signal corresponding to early and late local signal replica of the first satellite signal, which are used to track the direct path of the first satellite signal.

22. The signal processing method of claim 19, where the first correlation result comprises one sample point of ACF of the first satellite signal corresponding to prompt local signal replica of the first satellite signal, which is used to track and/or decode the direct path of the first satellite signal.

23. The signal processing method of claim 19, where the second correlation result comprises one sample point of the ACF of the second satellite signal, which is used to search possible reflected path of the second satellite signal.

24. The signal processing method of claim 19, where the first correlation result comprises one sample point of the ACF of the first satellite signal corresponding to prompt local signal replica of the first satellite signal, and the second correlation result comprises two sample points of the second satellite ACF corresponding to the prompt local signal replica of the direct and reflected path respectively.

25. The signal processing method of claim 15, wherein the first correlation result is a composite ACF comprising an early code and a late code correlation of a first ACF corresponding to a direct path of the first satellite signal and a second ACF corresponding to a reflected path of the first satellite signal, and the second correlation result comprises an early code and a late code correlation of a third ACF corresponding to a direct path of the second satellite signal, and an early code and a late code of a fourth ACF corresponding to a reflected path of the second satellite signal; and the step of using the second correlation result to compensate the first correlation result to generate the compensated first correlation result comprises:
predicting the second ACF according to the early code and the late code of the third ACF and the early code and the late code of the fourth ACF, and using the predicted second ACF to compensate the composite ACF to obtain the compensated first correlation result.

26. The signal processing method of claim 25, wherein the step of using the predicted second ACF to compensate the composite ACF to obtain the compensated first correlation result comprises:
using the predicted second ACF to compensate at least one of the early code and the late code of a first ACF to obtain the compensated first correlation result.

* * * * *